(No Model.)  3 Sheets—Sheet 1.

C. F. DANIELS.
ELECTRIC MOTOR OR DYNAMO.

No. 527,776. Patented Oct. 23, 1894.

WITNESSES:
Henry D. Williams
Thomas Foley

INVENTOR
Cornelius F. Daniels
BY
Writer & Kenyon
ATTORNEYS.

UNITED STATES PATENT OFFICE.

CORNELIUS F. DANIELS, OF MACON, GEORGIA.

ELECTRIC MOTOR OR DYNAMO.

SPECIFICATION forming part of Letters Patent No. 527,776, dated October 23, 1894.

Application filed December 2, 1891. Serial No. 413,840. (No model.)

*To all whom it may concern:*

Be it known that I, CORNELIUS F. DANIELS, a citizen of the United States, residing at Macon, in the county of Bibb and State of Georgia, have invented certain new and useful Improvements in Electric Motors or Dynamos, of which the following is a full, clear, and exact specification.

The object of my invention is to produce a new and improved multi-polar electric motor or dynamo-electric machine, and it consists in the improved devices hereinafter shown, described and claimed.

My improved device consists of a number of separate and independent field magnets, each magnet being made up of two parts, one forming the positive and the other the negative pole of the magnet, the positive pole of one magnet adjoining the negative pole of the next magnet and so on around the entire circle.

Figure 1:
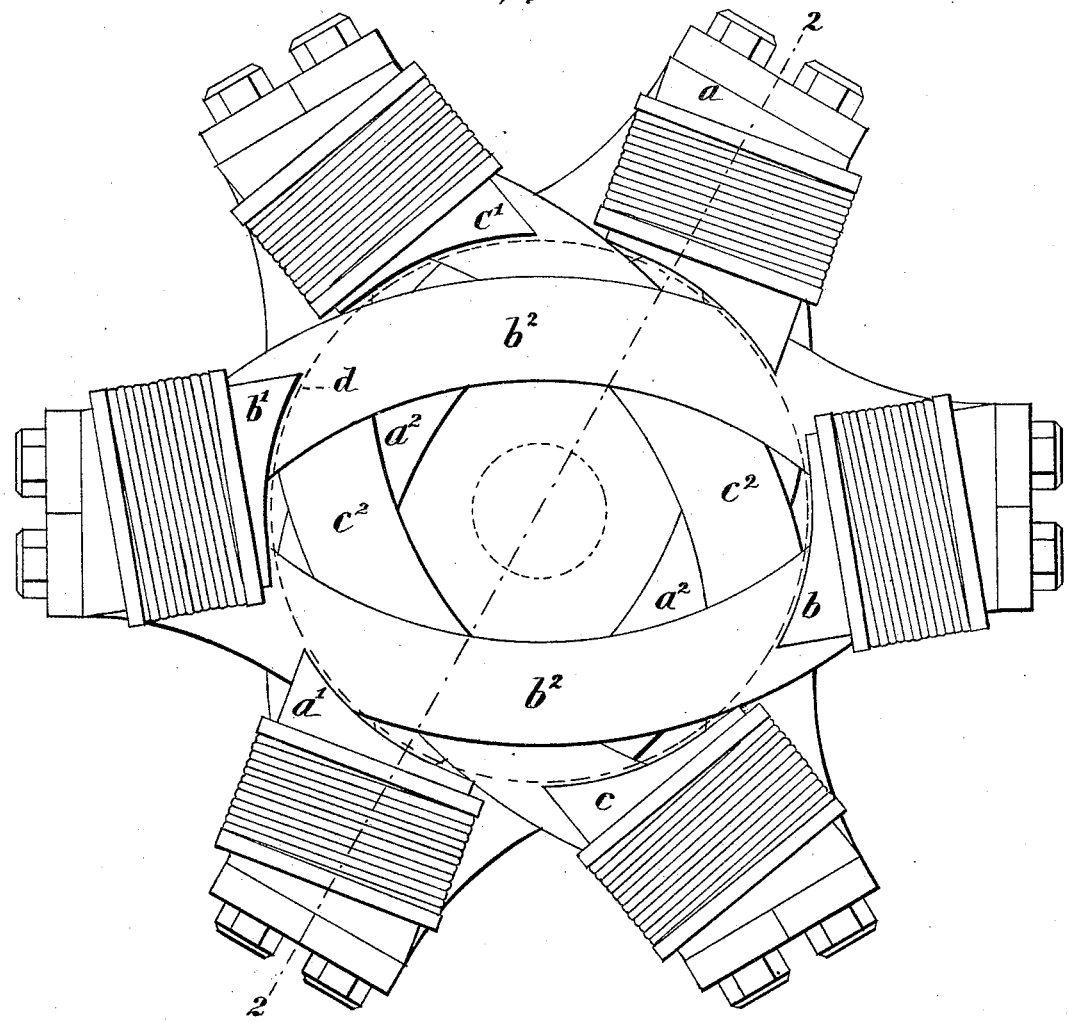
Figure 2:
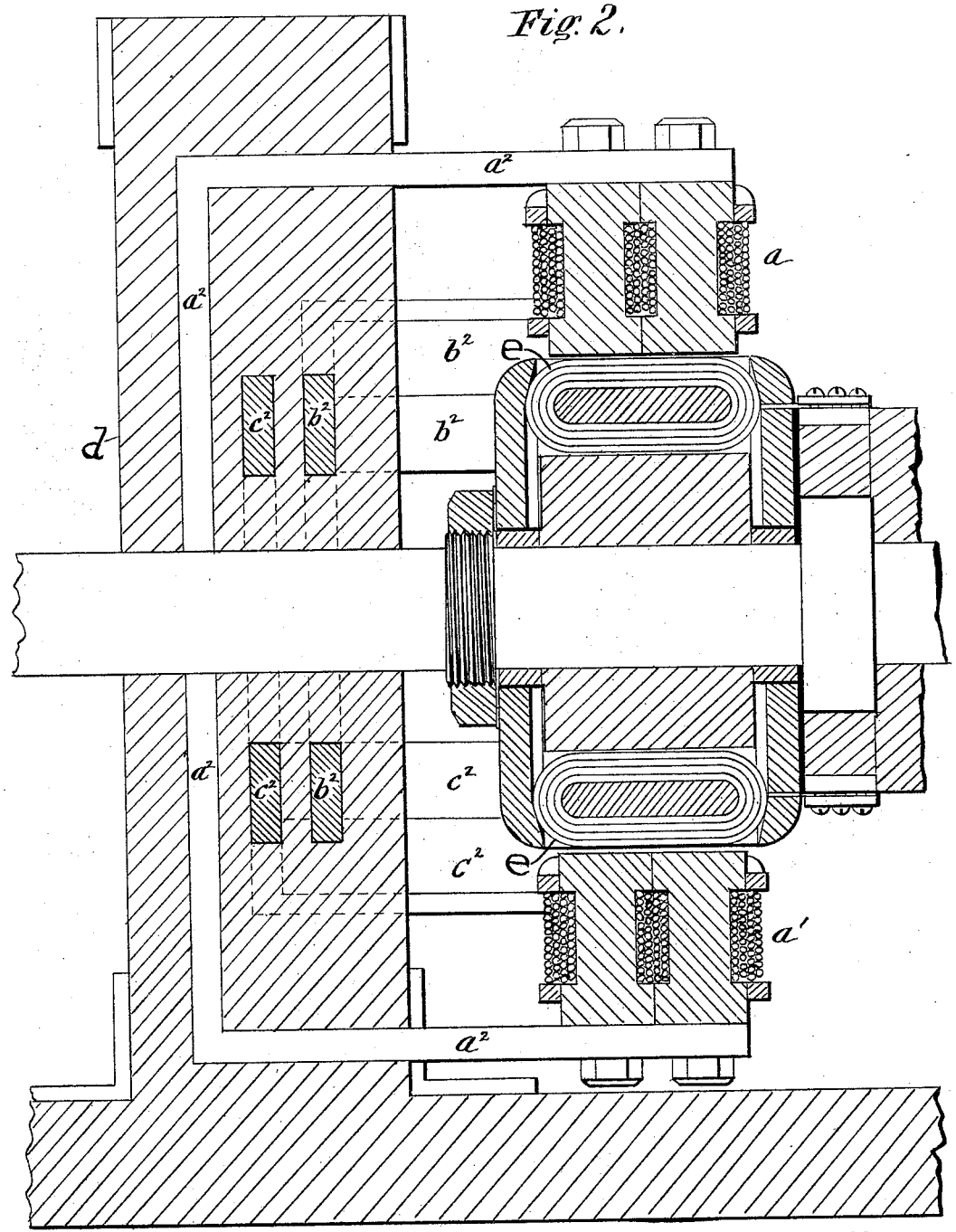
Figure 3:
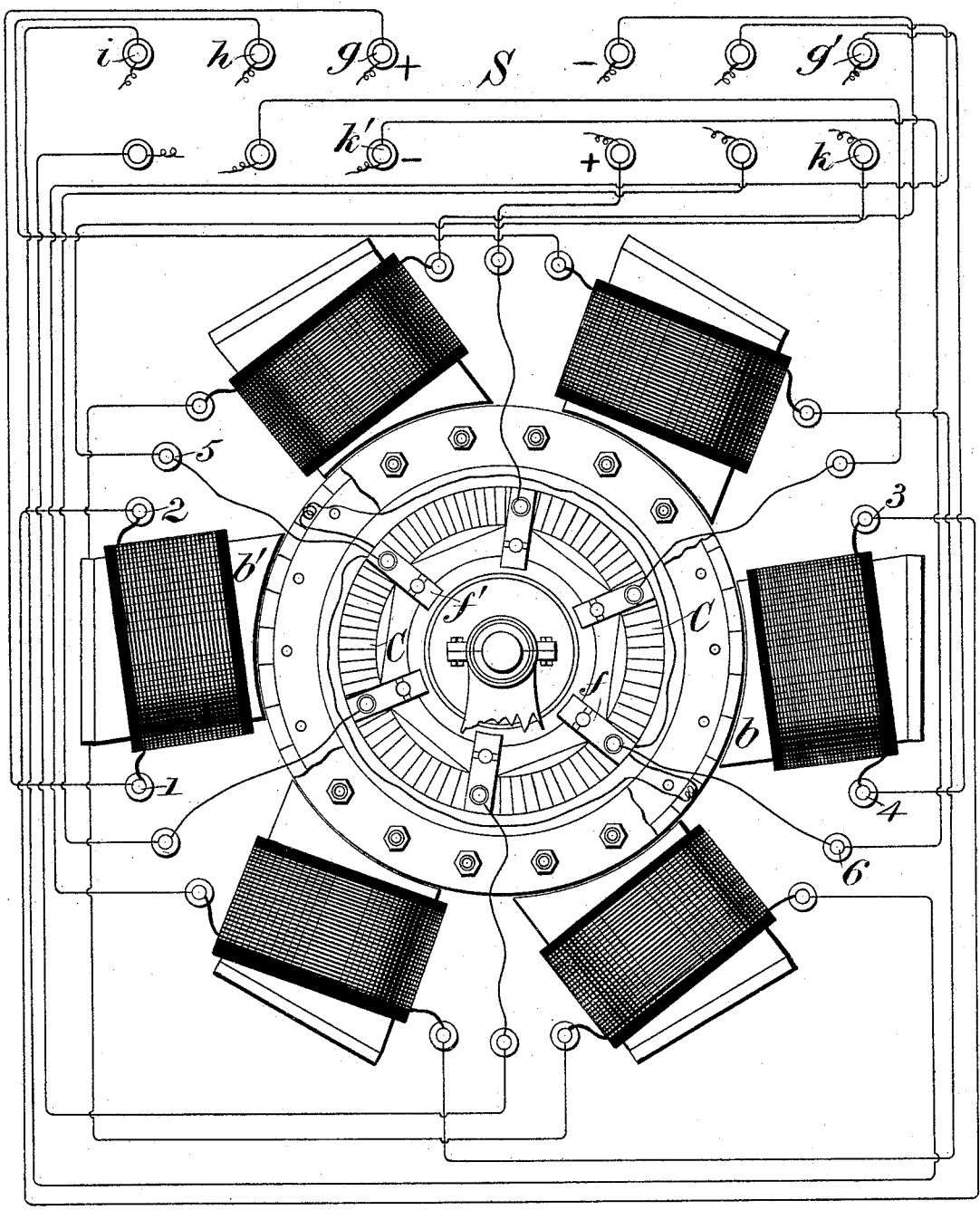

In the accompanying drawings Figure 1 is a side elevation of the field magnets of my improved electric motor or dynamo, showing them arranged in proper positions but detached from their supports. Fig. 2 is a vertical section of the machine cut through the field magnets on the line 2—2 of Fig. 1. Fig. 3 is an elevation showing magnets and brushes in their relation to the commutator, and a switch board in connection therewith.

The drawings show my improved machine as containing three magnets; but it is evident that any odd number of magnets that may be desired can be used. These three magnets are lettered $a$, $a'$, and $b$, $b'$, and $c, c'$, respectively. Each magnet is composed of two parts arranged diametrically opposite each other and each part is wound with insulated wire and provided with a pole piece, and these two parts are joined by two curved iron bars which extend from one part to the other, leaving an opening between them for the armature shaft or axis. The two curved bars of the magnet $a$ $a'$ are lettered $a^2$, those of the magnet $b$ $b'$ are lettered $b^2$ and those of the magnet $c$ $c'$ are lettered $c^2$. These bars $a^2$, $b^2$ and $c^2$ have angular extensions of different lengths so that they will fit one alongside another and they are held by a frame $d$, preferably of wood or other insulating material.

The cores and coils of the field magnets may be constructed in any usual manner, but I prefer to make the cores in two or more sections, each section being wound with insulated wire, and the combined cores and coils when placed together being wound with insulated wire, such being the construction described and claimed in my application for Letters Patent filed simultaneously herewith and designated by the Serial No. 413,839, said application having been allowed July 14, 1892.

The two coils of $a$ and $a'$, are electrically connected together so that they form but one magnet. This is true of the coils of $b$ and $b'$ and also of the coils of $c$ and $c'$, respectively. If $b$ is positive, $b'$ is negative; if $c$ is positive $c'$ is negative, and so on. Adjacent poles are electrically opposite. Thus if $a$ is positive $b'$ and $c'$ are negative, $b$ and $c$ each positive and $a'$ negative. The pair $a$ $a'$ is not connected electrically with $b$ $b'$ or $c$ $c'$. They are separate and distinct from every other pair in the machine and this is true also of each pair or magnet in the machine.

The brushes are shown in Fig. 3 of the drawings, the same being suitably arranged between the poles, the opposite ones being connected to form a pair. It is evident there will be as many pairs of brushes $f, f'$ as there are separate magnets. The armature $e$ revolves in the space between the magnets.

The wire connections which I have indicated in Fig. 3 are such as are used on all simple machines, but I may briefly explain their arrangement in relation to one pair of magnets, as follows:—The wire, say starting at the binding post $g$ on the switch board S extends to the binding post 1, thence around one pole piece or core $b'$ of one of the magnets, to post 2, thence across to 3 and around the opposite pole $b$ of the same magnet, out at 4, whence it returns to the switch board at $g'$, and across to $k$ through any ordinary cut-out. Not shown. From here connection is made through binding post 5 with brush $f'$, and the wire then goes to the commutator C and to the proper bobbin of the armature, extending around such bobbin to the opposite side of the commutator and to the second brush $f$, thence through 6 to post $k'$ on the switch board, and line back to post $g$, thus completing the circuit through one pair of field magnets and practically forming one complete machine without any necessary electrical connection with either of the other magnets.

When my invention is employed as a motor, the connection with the power current is usually made at the post $g$ through a rheostat and at $h$ and $i$ through cut-outs, these connections and devices not being shown as they are readily understood by electricians.

With my improved device used as a motor I can employ as many different currents as there are separate magnets and can take them from one source or as many different sources as there are magnets. Used as a dynamo I can utilize the electricity for one purpose or for as many different purposes as there are separate magnets.

One magnet can be employed alone whether the machine is used as a motor or a dynamo, or as many as desired can be used.

My improved device permits of any desired increase in the size or diameter of the armature to be employed. The number of magnets can be increased with the increased diameter of the armature. Very large and powerful armatures can therefore be used. This is of great importance in motors, as the increased diameter of the armature gives greater leverage and permits of slower rotation of the armature.

What I claim as new, and desire to secure by Letters Patent, is—

1. In an electric motor or dynamo, the combination with a suitable armature, commutator, brushes and line connections, of a series of field electro-magnets separate and independent of each other, each magnet consisting of two parts on opposite sides of the armature connected together, one forming the positive and the other the negative pole, the adjacent poles of contiguous magnets being of magnetically opposite signs, substantially as set forth.

2. In an electric motor or dynamo, a series of field electro magnets separate and independent of each other, each magnet consisting of two parts on opposite sides of the armature connected together, one forming the positive and the other the negative pole, and brushes connected in pairs, between the poles of the magnets, substantially as shown and described.

3. In an electric motor or dynamo, a series of field electro magnets separate and independent of each other, each magnet consisting of two parts on opposite sides of the armature connected together, one forming the positive and the other the negative pole, the adjacent poles of contiguous magnets being of magnetically opposite signs, and brushes connected in pairs between the poles of the magnets, substantially as shown and described.

4. In the field of an electric motor or dynamo, a series of field electro magnets electrically separate and independent of one another, each magnet consisting of two magnets on opposite sides of the armature connected electrically and one forming the positive and the other the negative pole, substantially as shown and described.

5. In an electric motor or dynamo, field magnets separate and independent of each other, each magnet consisting of two parts, as $a$ $a'$ connected by curved and angular bars as $a^2$ $a^2$, substantially as set forth.

CORNELIUS F. DANIELS.

Witnesses:
HENRY D. WILLIAMS,
LEONARD E. WELCH, Jr.